UNITED STATES PATENT OFFICE 2,371,694

PYRIDINE-3,4-DINITRILES

Richard Kuhn and Otto Westphal, Heidelberg, Germany, assignors to Winthrop Chemical Company, Inc., New York, N. Y., a corporation of New York No Drawing. Application January 26, 1940, Serial No. 315,746. In Germany January 27, 1939

9 Claims. (Cl. 260—296)

This invention relates to pyridine-3.4-dinitriles or -4.5-dinitriles, and to a process of preparing the same.

In accordance with the present invention pyridine-3.4-dinitriles which are identical with pyridine-4.5-dinitriles can be obtained by reacting upon pyridine-3.4-dicarboxylic acid diamides or -4.5-dicarboxylic acid diamides respectively, with an agent capable of splitting off water from the carboxylic acid amide groups, such as acid anhydrides of the type of acetic anhydride and phosphorus pentoxide, furthermore acid halides of the type of phosphorus oxychloride and thionylchloride. The said pyridine-3.4-dinitriles are formed as the main products together with other reaction products upon heating of the pyridine-3.4-dicarboxylic acid diamides with the agent capable of splitting off water if the time of heating is properly adjusted to the quantity and the particular type of the initial material. Larger quantities of the initial material require a prolonged reaction time.

It is most surprizing that by such chemical dehydration the pyridine-3.4-dicarboxylic acid diamides can be transformed relatively easily into the corresponding pyridine-3.4-dinitriles in view of the fact that pyridine-2.3-dicarboxylic acid diamides cannot be converted into pyridine-2.3-dinitriles by chemical dehydration, for instance by heating with acetic anhydride or with a mixture of acetic anhydride and glacial acetic acid. The latter product can be obtained from the former only in a bad yield by heating the pyridine-2.3-dicarboxylic acid diamide with a catalyst.

The new pyridine-3.4-dinitriles are intended to be used as initial materials for chemical syntheses, particularly in the synthesis of compounds of the type of vitamin $B_6$.

The invention is illustrated by the following examples without, however, being restricted thereto:

Example 1

2 grams 5-bromo-pyridine-3.4-di-carboxylic acid diamide (well dried by means of phosphorus pentoxide at 70° C.) are boiled under reflux with 30 ccs. of acetic anhydride for 4½ to 5 hours. After the first hour all matter has dissolved. After 4–5 hours the yellow solution becomes noticeably brown. It is cooled and treated with excess absolute methanol. The mixture is stored for some time and then freed under reduced pressure from ethyl acetate and acetic acid, the oily residue is once more treated with methanol and the solution again evaporated under reduced pressure. The brown oil residue is sublimed at 0.03 mm. pressure. The 5-bromo pyridine-3.4-di-carboxylic acid dinitrile sublimes at 60–80° C. in shining solid rosettes (with a yield of about 50%). Above 90° C. other products are obtained. When again sublimed or recrystallized from chloroform-petroleumether snow white crystals are obtained melting at 125° C. with an extremely bitter taste.

The residue of the sublimation can be boiled again for 3 hours with acetic anhydride (25 ccs.). There are obtained still about 10% of the dinitrile.

If the mixture is boiled for a too short time, the yield of dinitrile is by far worse, if it is boiled for a too long time, apart from the dinitrile a mononitrile is obtained, which already sublimes at 40° C. under 0.03 mm. pressure (shining, star-shaped needles melting at 69° C.). When starting with the twofold quantity of the starting-material, it is preferably heated for 6½ hours.

Example 2

2.6 grams of 2-methyl-3-methoxy-pyridine-4.5-di-carboxylic acid diamide are boiled for 4 hours with 45 ccs. of acetic anlydride. Thereupon the excess acetic anhydride is distilled off under reduced pressure, and the residue is dissolved in ether. When the undissolved matter has been filtered off, the ethereal solution is twice shaken out with dilute sodium hydroxide solution and dried with potassium carbonate. After the removal of the ether the residue boils under 0.2 mm. pressure at 110° C. White crystals of the 2-methyl-3-methoxy-pyridine-4.5-dinitrile are obtained.

The starting-material is obtained as follows:
12.8 grams of 2-methyl-3-methoxy-pyridine-4.5-dicarboxylic acid are dissolved in methanol and treated with excess ethereal diazomethane solution. After 12 hours the solvent is distilled off and the residue is distilled under 1 mm. pressure at 126° C. The dimethylester thus obtained is shaken with 200 ccs. of aqueous ammonia solution until it has dissolved and then cooled. After some time white crystals of the 2-methyl-3-methoxy-pyridine-4.5-dicarboxylic diamide have separated. They melt at 245° C. (not sharply) while decomposing.

We claim:
1. A pyridine-3.4-dinitrile.
2. 2-Methyl-3-methoxy-pyridine-4.5-dinitrile.
3. 5-Bromo-pyridine-3.4.-dinitrile.
4. The process for preparing a pyridine-3.4- dinitrile which comprises reacting upon a pyridine-3.4-dicarboxylic acid diamide with an agent capable of splitting off water selected from the group consisting of acetic anhydride, phosphorus pentoxide, phosphorus oxychloride and thionyl chloride.

5. The process for preparing 2-methyl-3-methoxy-pyridine-4.5 dinitrile which comprises reacting upon 2-methyl-3-methoxypyridine-4.5-dicarboxylic acid diamide with an agent selected from the group consisting of acetic anhydride, phosphorus pentoxide, phosphorus oxychloride and thionyl chloride.

6. The process for preparing 2-methyl-3-methoxy-pyridine-4.5-dinitrile which comprises reacting upon 2-methyl-3-methoxypyridine-4.5-dicarboxylic acid diamide with acetic anhydride while boiling.

7. The process for preparing a pyridine-3.4-dinitrile, which comprises reacting upon a pyridine-3.4-dicarboxylic acid diamide with thionyl chloride.

8. The process for preparing 2-methyl-3-methoxy-pyridine-4.5-dinitrile, which comprises reacting upon 2-methyl-3-methoxy-pyridine-4,5-dicarboxylic acid diamine with thionyl chloride.

9. A 2-methyl-3-lower alkoxy-pyridine-4,5-dinitrile.

RICHARD KUHN.
OTTO WESTPHAL.